Oct. 12, 1937.                M. P. HOLMES                 2,095,255
                        EXPANSIBLE CHAMBER MOTOR
                        Filed Nov. 30, 1934           3 Sheets-Sheet 1
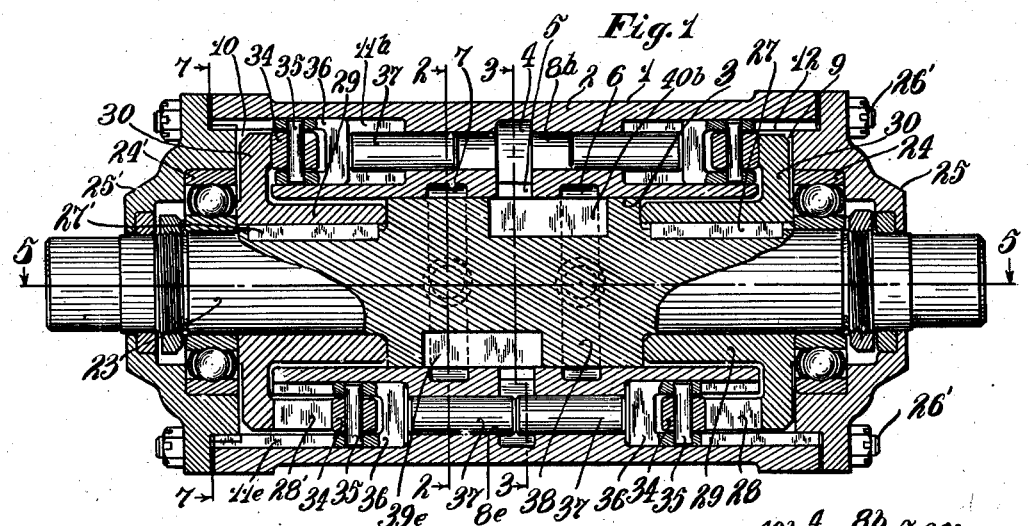
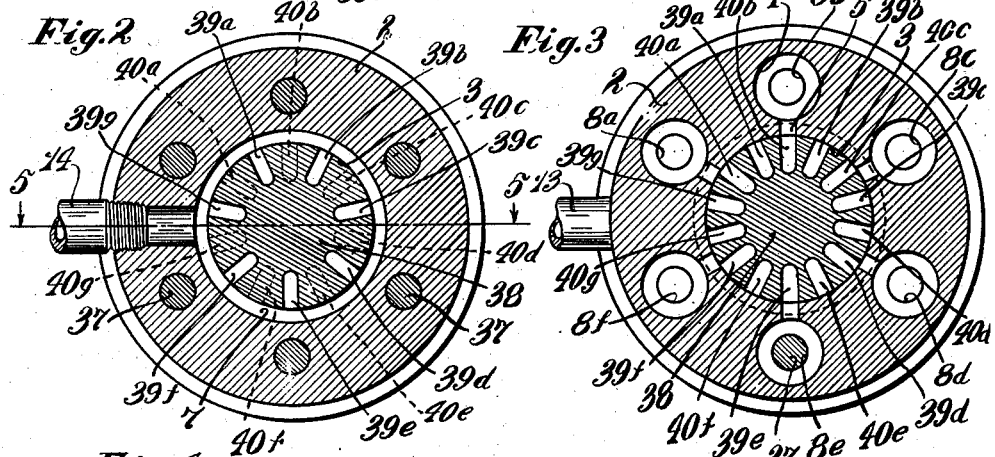
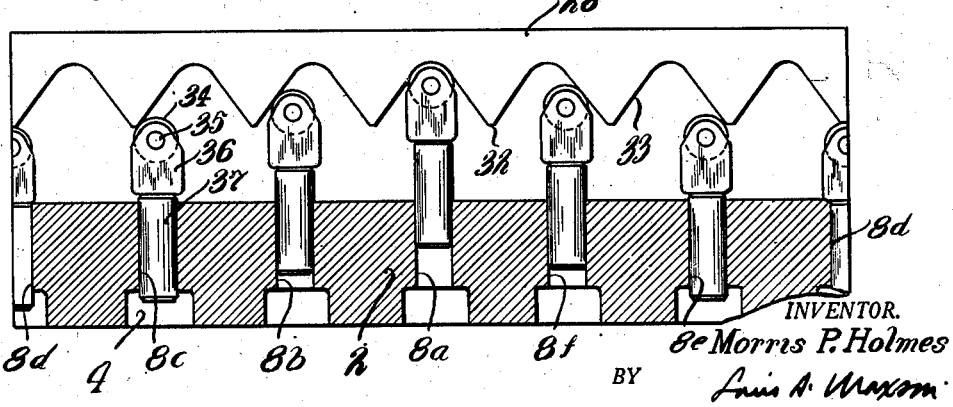
INVENTOR.
Morris P. Holmes
BY
ATTORNEY Oct. 12, 1937.  M. P. HOLMES  2,095,255
EXPANSIBLE CHAMBER MOTOR
Filed Nov. 30, 1934   3 Sheets-Sheet 2
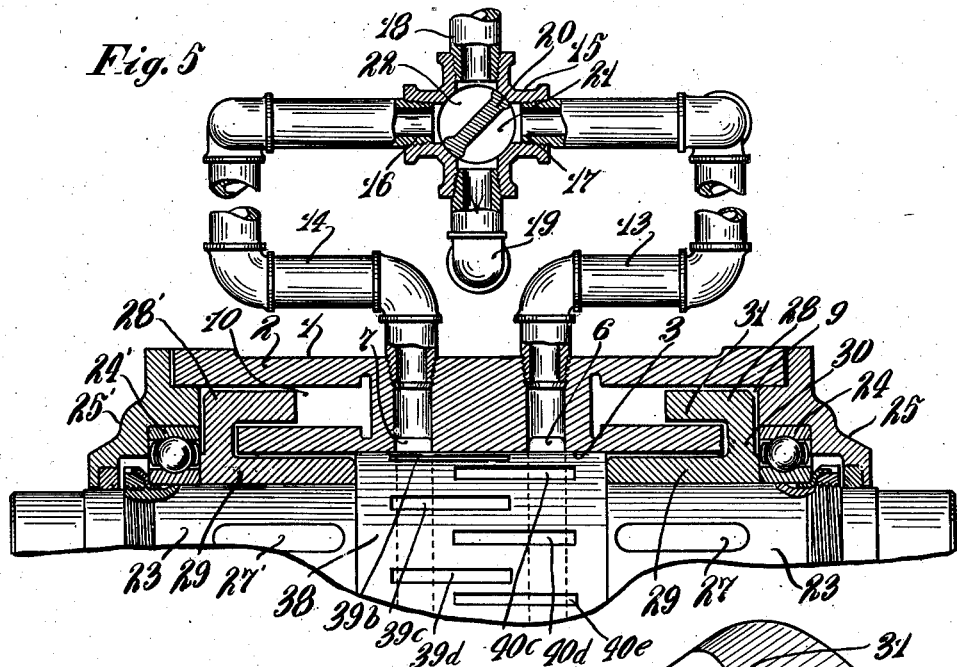
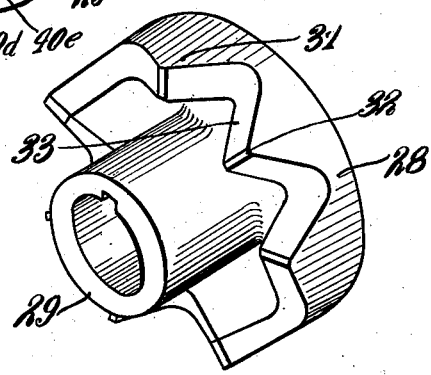
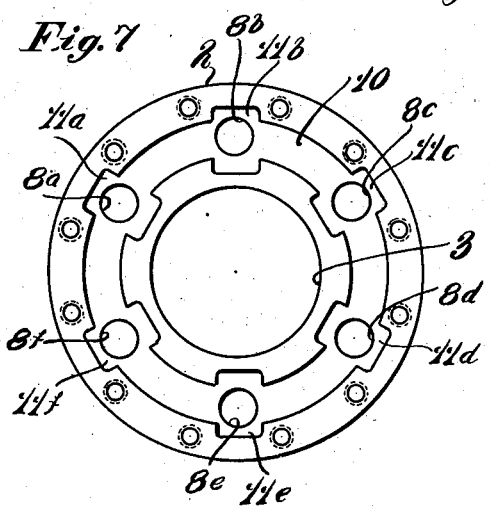
INVENTOR.
Morris P. Holmes
BY
ATTORNEY Oct. 12, 1937. M. P. HOLMES 2,095,255
EXPANSIBLE CHAMBER MOTOR
Filed Nov. 30, 1934 3 Sheets-Sheet 3
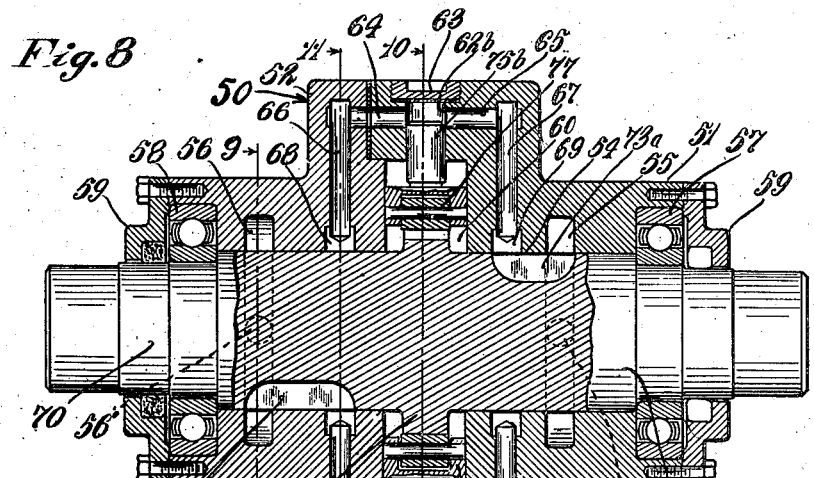
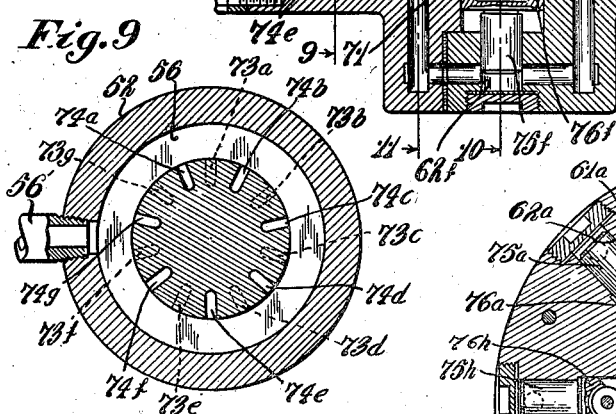
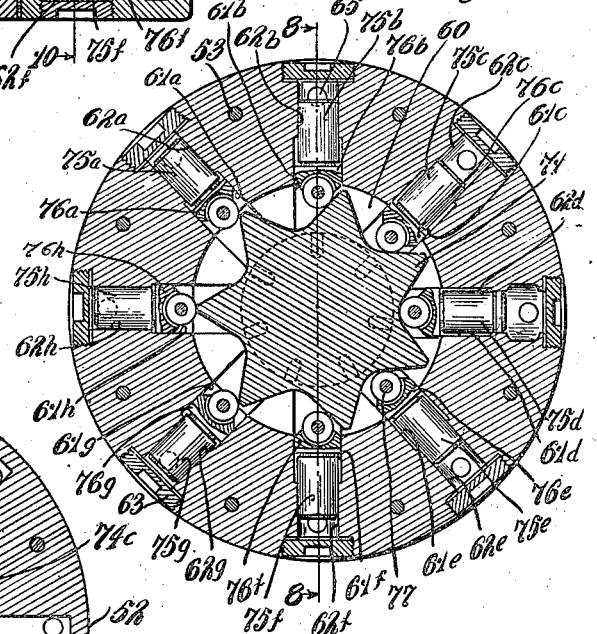
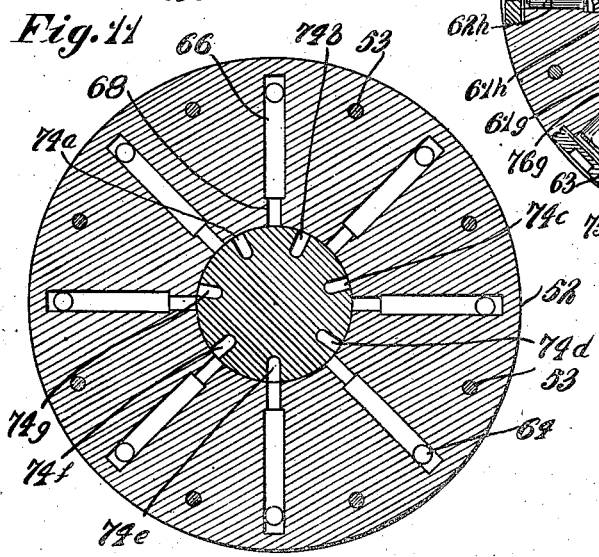
Inventor:
Morris P. Holmes
by *Anis A. Maxson.*
Atty.

Patented Oct. 12, 1937

2,095,255

UNITED STATES PATENT OFFICE 2,095,255

EXPANSIBLE CHAMBER MOTOR

Morris P. Holmes, Claremont, N. H., assignor to Sullivan Machinery Company, a corporation of Massachusetts Application November 30, 1934, Serial No. 755,277

37 Claims. (Cl. 121—119)

My invention relates to expansible chamber motors and more particularly to expansible chamber motors of the hydraulic type.

It is an object of my invention to provide an improved expansible chamber motor. It is another object of my invention to provide an improved expansible chamber motor of the hydraulic type. It is a further object of my invention to provide an improved expansible chamber motor of the reversible type. It is still another object of my invention to provide an improved expansible chamber motor of the multi-cylinder high-torque type. It is still a further object of my invention to provide an improved expansible chamber motor in which pressure at very high ranges may be employed and, with a minimum of internal friction, power in substantial quantity developed in a motor of small compass. Other objects and advantages of my invention will hereinafter more fully appear.

In the accompanying drawings, in which two embodiments which my improved expansible chamber motor may adopt in practice have been shown for purposes of illustration:

Fig. 1 is a central longitudinal section through one of the illustrative embodiments;

Fig. 2 is a transverse section on a plane corresponding to the line 2—2 of Fig. 1;

Fig. 3 is a transverse section on a plane corresponding to the line 3—3 of Fig. 1;

Fig. 4 is a developed diagrammatic view of one longitudinal half of the motor;

Fig. 5 is a view with parts broken away and other parts shown in axial section at right angles to Fig. 1, the section being taken on a plane corresponding to line 5—5 of Figs. 1 and 2;

Fig. 6 is a perspective view of one of the cams or trackways incorporated in the motor;

Fig. 7 is a sectional view showing the end of the cylinder block from one end of the latter with internal loose parts removed;

Fig. 8 is a central longitudinal sectional view through a modified form of construction;

Fig. 9 is a sectional view on a plane corresponding to line 9—9 of Fig. 8;

Fig. 10 is a sectional view on a plane corresponding to line 10—10 of Fig. 8;

Fig. 11 is a sectional view on a plane corresponding to the line 11—11 of Fig. 8.

Referring to the drawings, it will be observed that the motor illustrated in Figs. 1 to 7, inclusive, is generally designated 1 and comprises a cylindrical casing 2 which is symmetrical at the opposite sides of practically all axial planes and also at opposite sides of its central transverse plane.

The casing 2 is provided with a central cylindrical bore or chamber 3 which has formed in its inner wall midway between its ends a series of circular pockets 4 each communicating with the bore 3 through a radial passage 5, and at the opposite sides of these pockets 4 is formed a pair of shallow circular grooves respectively designated 6 and 7. The central portion of the casing 2, referring to the same in respect to its longitudinal dimension, is traversed by a plurality of longitudinal cylindrical bores 8a, 8b, 8c, 8d, 8e and 8f, these passing through the central pockets 4 so that there are provided at opposite sides of said central pockets six cylindrical bores nearer the ends of the member 2. The bores 8a, 8b, etc. communicate with a circular chamber of which there is one relatively near each end of the casing 2, these annular chambers being designated 9 and 10. These annular chambers are not provided with walls which are uniformly circular, but, instead, opposite each of the cylinder bores 8a, 8b, etc. there is provided a rectangular space to provide a crosshead guide, as it were, extending lengthwise of the casing, and these rectangular spaces are numbered 11a, 11b, etc. with like exponential letter as the corresponding cylinder with which they are alined. At the outer ends of the casing 2 only the outer halves of the guides extend completely to the end of the member 2, the inner portions being cut away so that there is a truly annular chamber except for the indented periphery thereof formed at 12. The shallow grooves 6 and 7 are respectively connected by piping 13 and 14 with a four-way valve chamber 15 entering the same at diametrically opposite points 16 and 17, and the other two quarters of the valve casing are connected with a supply line 18 for fluid under a high pressure and an exhaust connection 19. Within the four-way valve casing, a manually operable valve member 20 of a usual design having flow connections 21 and 22 in the form of grooves, in its lateral walls, is arranged to connect the pipe 13 with the exhaust connection 19 and the pipe 14 with the supply connection 18 or vice versa as desired. Within the central main bore 3 in the casing 2 there is mounted a drive shaft 23 which is herein rotatable relative to the casing 2 and is journaled in the heads of the latter in ball bearings 24 and 24'. The casing heads are designated 25 and 25' and are maintained in assembled relation with respect to the cylinder by screw studs 26' threaded within longitudinal openings in the casing. To the drive shaft 23 near the opposite ends of the latter but within the casing there are keyed, as at 27, 27', a pair of cam or abutment track-forming members 28 and 28', whose construction includes a central sleevelike portion 29 connected, by the key referred to, to its respective end of the shaft and having projected into one of the annular spaces 9, 10 and supported upon a web portion 30 a cam or guide portion 31 whose periphery is cylindrical but whose face or end toward the centre of the casing member 2 is provided with a series of tooth portions 32, there being in the construction illustrated one more tooth portion 32 than there are cylinders 8a, 8b, etc., although the number may be varied at will subject to the design possibilities of the motor. These members 32 provide cam or roller tracks 33 in the form of modified star wheels, and with the latter there cooperate rollers 34 suitably supported by heavy bearings 35 on crosshead members 36 which slide rectilinearly in the crosshead guides 11a, 11b, etc. and which are actuated by the piston or plunger members 37, the latter sliding in the several cylinder bores 8a, 8b, etc. It will be evident that the members 31 at the opposite ends of the casing member 2 may be modified in shape.

The enlarged central part of the drive shaft 23 has a close-running fit for the main casing bore 3 at the central part of the latter and this enlarged central portion is numbered 38. The portion 38 is provided in its periphery with two series of staggered longitudinal grooves or recesses. The grooves in one of these series are designated 39a, 39b, 39c, etc. while those of the other series are designated 40a, 40b, 40c, etc. The grooves 39a, 39b, etc. act as admission grooves while the grooves 40a, 40b, etc. act as exhaust grooves, and vice versa, depending upon the position of the reversing valve 20. It will be noted that the overlapping portions of each set of grooves extend to a point substantially midway longitudinally of the enlarged portion 38 so that both series of grooves may communicate with the several radial passages 5 of the pockets 4.

This embodiment of the motor will be readily understood from the description so far given. Referring to Figs. 3 and 4 it will be noted that the plunger bore 8a is just beginning to communicate with exhaust; plunger bore 8b is in full communication with exhaust; 8c is nearly out of communication with exhaust; 8d has begun to communicate with the inlet; 8e is in full communication with the inlet, and 8f has nearly ceased to have communication with the inlet and will shortly again come in communication with the exhaust. The various plungers are so related to the projections 32 on the cam or toothed member that the latter is caused to rotate, and with it the drive shaft 23 is caused to rotate. Due to the double-ended arrangement there is no net longitudinal thrust in the motor because the opposite longitudinal thrusts counterbalance each other. It is accordingly possible to use very high pressures without difficulty. The device can be driven, for use as a pump; and, of course, if the shaft be held, the casing will rotate when the device is being used as a motor.

Referring to the second species of the invention shown in Figs. 8 to 11 inclusive, it will be noted that a cylindrical casing 50, comprising two portions 51 and 52 held together by through-bolts 53, provides an internal chamber 54 which has annular grooves 55 and 56 communicating with it and opening into it near the opposite ends of the chamber. Fluid pressure may be supplied from any suitable source to or exhausted from these grooves through pipes 55' and 56' respectively, under the control of a four-way valve, in the manner described above in regard to the other form of the invention. Ball bearings 57 and 58 are housed within the opposite ends of the casing 50 and are maintained in position by head members 59. The chamber 54 has at its central portion a larger annular groove 60 with which there communicates a series of rectangular radial guide slots 61a, 61b, etc., and in line with the latter is a series of cylinders 62a, 62b, etc., the latter closed at their outer ends by detachable threaded heads 63. The outer ends of the several cylinders 62a etc. communicate at their opposite sides, respectively, with ports 64 and 65, these ports in turn communicating with radial ports 66 and 67 extending down to relatively narrow rectangular mouths 68 and 69 respectively. Within the bore within the casing 50 there is rotatably mounted a shaft member 70 which has a star-wheel portion 71 at about its middle. This star-wheel portion has herein one less point than the number of radial cylinders 62a, etc., although the number may be varied as desired. The shaft is further provided at opposite sides of the star-wheel portion with series of peripheral slots 73a, 73b, etc. and 74a, 74b, etc., which respectively serve to connect annular groove 55 and the ports 67 and the annular groove 56 and the port 66. The cylinders 62 contain plungers 75a, 75b, etc. carrying rectangular guide portions 76a, 76b, etc., at their outer ends, guided in the guide slots 61a, 61b, etc., and providing journals for rollers 77 which cooperate with the inclined cam-like surfaces of the star-wheel.

With the above explanation, the mode of operation of this form of the motor will be readily understood. Referring to Fig. 10, it being understood that the reverse valve 20 is in the same position as in Fig. 5, pressure fluid is supplied to the grooves 74a, 74b, etc., while the grooves 73a, 73b, etc. are connected to exhaust. It will be noted that the plunger 75a is just going out of communication with exhaust; plunger 75b is in full communication with exhaust; 75c is just coming into communication with exhaust; 75d is out of communication with both the inlet and exhaust; 75e is just ending communication with the inlet; 75f is in full communication with the inlet; 75g is just beginning to have communication with the inlet; and 75h is out of communication with both the inlet and exhaust. The various plungers are so related to the projections of the star-wheel portion 71 that the latter is caused to rotate, and with it the drive shaft 70, the rollers 77 carried by the plungers engaging with a wedge action the surfaces of the star wheel projections, thereby to impart a continuous wedge-like motion to effect shaft rotation. Obviously, by reversing the valve 20, pressure fluid may be supplied to the grooves 73a, 73b, etc., while the grooves 74a, 74b, etc. are connected to exhaust, thereby reversing the direction of rotation of the motor shaft. Otherwise this form of the invention is the same as that above described.

As a result of this invention, it will be noted that an improved hydraulic motor is provided having an improved arrangement of the parts whereby a motor of an extremely compact structure is attained. It will further be noted that by arranging the motor elements in the manner disclosed and by forming the valving elements on the shaft to be driven, an improved and simplified control of the fluid distribution is obtained. These and other uses and advantages of the improved motor will be clearly apparent to those skilled in the art.

While I have in this application specifically described two forms which my invention may assume in practice, it will be understood that these forms of the same are shown for purposes of illustration, and that the invention may be modified and embodied in various other forms without departing from its spirit or the scope of the appended claims.

What I claim as new and desire to secure by Letters Patent is:

1. In a motor, a cylinder member having a central bore, a motor shaft rotatably mounted in said bore, pistons reciprocably mounted in bores in said cylinder member, mechanical connections actuated by said pistons for effecting shaft rotation, and means including valve ports on the shaft and cooperating annular inlet and exhaust grooves formed in said cylinder member at points spaced longitudinally of the latter for controlling the flow of pressure fluid relative to said piston bores to effect actuation of the motor pistons.

2. In a motor, a cylinder member having a central bore, a motor shaft rotatably mounted in said bore, bearings therefor, said cylinder member having a plurality of piston chambers, motor pistons reciprocable in said piston chambers, mechanical connections actuated by said pistons for imparting rotation to the motor shaft, and valve means for controlling the supply of pressure fluid to the piston chambers comprising supply passages formed on said shaft and a stationary communicating supply groove on said cylinder member between the shaft bearings and in constant communication with said passages.

3. In a motor, a cylinder member having a central bore, a motor shaft rotatably mounted in said bore, said cylinder member having a plurality of piston chambers, pistons reciprocable in said piston chambers, mechanical connections actuated by said pistons for imparting rotation to the motor shaft, and means for supplying pressure fluid to and exhausting fluid from said piston chambers comprising mutually distinct supply and exhaust passages formed on said motor shaft and supply and exhaust grooves in said cylinder member at opposite sides of the central point of said shaft for respectively supplying fluid to said supply passages and receiving fluid from said exhaust passages.

4. In a motor, a cylinder having a central bore, a motor shaft rotatably mounted within said bore, said cylinder having a plurality of piston chambers extending longitudinally of the motor parallel with the motor shaft axis, pistons reciprocable in said piston chambers, mechanical connections actuated by said pistons for imparting rotative motion to the motor shaft, and means for supplying pressure fluid to and exhausting fluid from said piston chambers including fluid supply and exhaust passages on said motor shaft in the form of grooves on the peripheral surface thereof.

5. In a motor, a cylinder having a central bore, a motor shaft rotatably mounted in said bore, said cylinder having a plurality of radially disposed piston chambers, pistons reciprocable in said piston chambers, mechanical connections actuated by said pistons for imparting rotary motion to said shaft, and means for controlling the supply of pressure fluid to and exhaust of fluid from said piston chambers including supply and exhaust passages formed on said motor shaft and respectively disposed wholly at opposite sides of the radial planes in which said piston chambers lie.

6. In a motor, a cylinder having a central bore, a motor shaft rotatably mounted in said bore, said cylinder having a plurality of radially disposed piston chambers, pistons reciprocable in said piston chambers, wedge-like means actuated by said pistons for imparting rotary motion to said motor shaft, and means for controlling the supply of pressure fluid to and exhaust of fluid from said piston chambers including supply and exhaust passages formed on said motor shaft and respectively disposed wholly at opposite sides of the radial planes in which said piston chambers lie.

7. In a motor, a cylinder having a central bore, a motor shaft rotatably mounted in said bore, said cylinder having a plurality of piston chambers extending longitudinally of the motor and parallel with the motor shaft axis, pistons in said piston chamber, wedge-like means actuated by said pistons for imparting a rotary motion to said motor shaft, and means for controlling the supply of pressure fluid to and exhausting fluid from said piston chambers including supply and exhaust passages on said motor shaft in the form of grooves on the peripheral surface thereof.

8. In a motor, a cylinder having a central bore, a motor shaft rotatably mounted in said bore, said cylinder having two sets of piston chambers arranged about the motor axis with their axes extending parallel with the axis of said shaft, pistons reciprocable in said piston chambers, wedge-like means arranged at the opposite ends of said motor and actuated by different sets of pistons for imparting continuous rotary motion to the motor shaft, and means for controlling the supply of pressure fluid to and the exhaust of fluid from said piston chambers including supply and exhaust passages on said motor shaft in the form of grooves on the peripheral surface thereof.

9. In a motor, a cylinder having a central bore, a motor shaft rotatably mounted in said bore, said cylinder having a plurality of radially extending piston chambers, pistons reciprocable in said piston chambers, a member on said shaft upon which said pistons act to effect shaft rotation, and fluid admission means including valving means arranged at one side of the transverse zone in which said member lies and fluid exhaust means including valving means arranged at the other side of the transverse zone in which said member lies.

10. In a motor, a cylinder having a central bore, a motor shaft rotatably mounted in said bore, said cylinder having a plurality of radially extending piston chambers, pistons reciprocable in said piston chambers, a member on said shaft upon which said pistons act to effect shaft rotation, and fluid admission means arranged at one side of the central transverse plane of said member and fluid exhaust means arranged at the other side of the central transverse plane of said member, said fluid admission means including an annular supply groove surrounding said shaft at one side of said member and said fluid exhaust means including an annular fluid exhaust groove surrounding said shaft at the other side of said member.

11. In a motor, a cylinder member having a central bore, a motor shaft rotatably mounted in said bore, said cylinder member having cylinders formed therein and disposed in a series around said bore, pistons reciprocable in said cylinders, mechanism cooperating with said pistons to effect shaft rotation, and fluid supply and distribution means for said motor including an annular supply groove surrounding said shaft, an annular exhaust groove surrounding said shaft, said grooves arranged at opposite sides of the median transverse plane through said shaft and each extending continuously around and in unbroken communication with said shaft for its full arcuate extent, and means for effecting alternate communication of said grooves with said cylinders.

12. In a motor, a cylinder member having a central bore, a motor shaft rotatably mounted in said bore, said cylinder member having cylinders formed therein and disposed in a series around said bore, pistons reciprocable in said cylinders, mechanism cooperating with said pistons to effect shaft rotation, and fluid supply and distribution means for said motor including an annular supply groove in said cylinder member surrounding said shaft, an annular exhaust groove in said cylinder member surrounding said shaft, said grooves arranged at opposite sides of the median transverse plane through said shaft and each communicating unobstructedly with said shaft throughout the complete circumference of the latter, and means for effecting alternate communication of said grooves with said cylinders including radial distribution passages in said cylinder member and longitudinal peripheral grooves in said shaft.

13. In a motor, a cylinder member having a central bore, a motor shaft rotatably mounted in said bore, said cylinder member having cylinders formed therein and disposed in a series around said bore, pistons reciprocable in said cylinders, mechanism cooperating with said pistons to effect shaft rotation, and fluid supply and distribution means for said motor including an annular supply groove in said cylinder member surrounding said shaft, an annular exhaust groove in said cylinder member surrounding said shaft, said grooves arranged at opposite sides of the median transverse plane through said shaft and each communicating unobstructedly with said shaft throughout the complete circumference of the latter, and means for effecting alternate communication of said grooves with said cylinders including radial distribution passages in said cylinder member at opposite sides of each cylinder and longitudinal grooves in said shaft.

14. In a motor, a cylinder structure providing a plurality of radially extending cylinders whose axes lie in a common plane perpendicular to the axis from which said cylinders extend radially and which open into a common bore, a shaft rotatably supported in said bore to turn on an axis in the same line with the axis from which said cylinders extend radially, pistons in said cylinders, operative connections between said pistons and said shaft, admission passages at one side of said plane leading to one end of each of said cylinders, exhaust passages at the other side of said plane leading from said end of each of said cylinders, said passages having mouths opening into said bore and said shaft having supply and exhaust ports therein, whereby certain of said mouths may be connected to supply and others simultaneously to exhaust.

15. In a motor, a cylinder member having a central bore, a motor shaft rotatably mounted in said bore, said cylinder member having cylinders formed therein and disposed in a series around said bore, pistons reciprocable in said cylinders, mechanism cooperating with said pistons to effect shaft rotation, and fluid supply and distribution means for said motor including an annular supply groove in said cylinder member surrounding said shaft, an annular exhaust groove in said cylinder member surrounding said shaft, said grooves arranged at opposite sides of the median transverse plane through said shaft, and means for effecting alternate communication of said grooves with said cylinders including radial distribution passages in said cylinder member and a series of longitudinal peripheral grooves in said shaft the alternate ones of which communicate respectively with the supply groove and with the exhaust groove but not with both.

16. In a motor, a cylinder member having a central bore, a motor shaft rotatably mounted in said bore, bearings therefor, said cylinder member having a plurality of radial piston chambers, motor pistons reciprocable in said piston chambers, mechanical connections, including cam means in common transverse planes with said pistons, actuated by said pistons for imparting rotation to the motor shaft, and valve means controlling the supply of pressure fluid to the piston chambers comprising supply passages formed on said shaft, and a stationary communicating supply groove on said cylinder member between the shaft bearings and in constant communication with said passages.

17. In a motor, a cylinder member having a central bore, a motor shaft rotatably mounted in said bore, said cylinder member having a plurality of radial piston chambers, pistons reciprocable in said piston chambers, mechanical connections, including cam means in common transverse planes with said pistons, actuated by said pistons for imparting rotation to the motor shaft, and means for supplying pressure fluid to and exhausting fluid from said piston chambers comprising mutually distinct supply and exhaust passages formed on said motor shaft and supply and exhaust grooves in said cylinder member at opposite sides of the central point of said shaft for respectively supplying fluid to said supply passages and receiving fluid from said exhaust passages.

18. In a motor, a cylinder member having a central bore, a motor shaft rotatably mounted in said bore, said cylinder member having cylinders formed therein and disposed in a series around said bore with their axes extending radially of said cylinder member, pistons reciprocable in said cylinders, mechanism cooperating with said pistons to effect shaft rotation, and fluid supply and distribution means for said motor including an annular supply groove surrounding said shaft, an annular exhaust groove surrounding said shaft, said grooves arranged at opposite sides of the median transverse plane through said shaft and each extending continuously around and in unbroken communication with said shaft for its full arcuate extent, and means for effecting alternate communication of said grooves with said cylinders.

19. In a motor, a cylinder member having a central bore, a motor shaft rotatably mounted in said bore, said cylinder member having cylinders formed therein and disposed in a series around said bore with their axes extending radially of said cylinder member, pistons reciprocable in said cylinders, mechanism cooperating with said pistons to effect shaft rotation, and fluid supply and distribution means for said motor including an annular supply groove in said cylinder member surrounding said shaft, an annular exhaust groove in said cylinder member surrounding said shaft, said grooves arranged at opposite sides of the median transverse plane through said shaft and each communicating unobstructedly with said shaft throughout the complete circumference of the latter, and means for effecting alternate communication of said grooves with said cylinders including radial distribution passages in said cylinder member and longitudinal peripheral grooves in said shaft.

20. In a motor, a cylinder member having a central bore, a motor shaft rotatably mounted in said bore, said cylinder member having cylinders formed therein and disposed in a series around said bore, pistons reciprocable in said cylinders, mechanism cooperating with said pistons to effect shaft rotation, said cylinders arranged with their axes extending radially of said cylinder member, and fluid supply and distribution means for said motor including an annular supply groove in said cylinder member surrounding said shaft, an annular exhaust groove in said cylinder member surrounding said shaft, said grooves arranged at opposite sides of the median transverse plane through said shaft and each communicating unobstructedly with said shaft throughout the complete circumference of the latter, and means for effecting alternate communication of said grooves with said cylinders including radial distribution passages in said cylinder member at opposite sides of each cylinder and longitudinal grooves in said shaft.

21. In a motor, a cylinder member having a central bore, a motor shaft rotatably mounted in said bore, pistons reciprocably mounted in bores in said cylinder member, mechanical connections including cam means actuated by said pistons for effecting shaft rotation, and means including valve ports on said shaft and cooperating annular inlet and exhaust grooves formed in said cylinder member at points spaced longitudinally of the latter and respectively at opposite sides of said cam means for controlling the flow of pressure fluid relative to said piston bores to effect actuation of the motor pistons.

22. In a motor, a cylinder member having a central bore, a motor shaft rotatably mounted in said bore, said cylinder member having cylinders formed therein and disposed in a series around said bore, pistons reciprocable in said cylinders, mechanism including cams projecting radially of said shaft and cooperating with said pistons to effect shaft rotation, and fluid supply and distribution means for said motor including an annular supply groove in said cylinder member surrounding said shaft, an annular exhaust groove in said cylinder member surrounding said shaft, said grooves arranged at opposite sides of the median transverse plane through said shaft, and means for effecting alternate communication of said grooves with said cylinders including radial distribution passages in said cylinder member and a series of longitudinal peripheral grooves in said shaft the alternate ones of which communicate respectively with the supply groove and with the exhaust groove but not with both.

23. In a motor, a cylinder having a central bore, a motor shaft rotatably mounted within said bore, said cylinder having a plurality of piston chambers extending longitudinally of the motor parallel with the motor shaft axis, pistons reciprocable in said piston chambers, mechanical connections actuated by said pistons for imparting rotative motion to the motor shaft, and means for effecting and controlling the supply of pressure fluid to said piston chambers including supply passages in the form of peripheral longitudinal grooves formed on said motor shaft and extending therealong in the same longitudinal zone as certain of said piston chambers.

24. In a motor, a cylinder having a central bore, a motor shaft rotatably mounted within said bore, said cylinder having a plurality of piston chambers extending longitudinally of the motor parallel with the motor shaft axis, pistons reciprocable in said piston chambers, mechanical connections actuated by said pistons for imparting rotative motion to the motor shaft, and means for supplying pressure fluid to and exhausting fluid from said piston chambers including fluid supply and exhaust passages formed on said motor shaft and extending oppositely longitudinally of said shaft from a zone opposite the rearmost piston positions.

25. In a motor, a cylinder having a central bore, a motor shaft rotatably mounted in said bore, said cylinder having a plurality of piston chambers extending longitudinally of the motor and parallel with the motor shaft axis, pistons in said piston chambers, wedge-like means actuated by said pistons for imparting a rotary motion to said motor shaft, and means for controlling the supply of pressure fluid to and exhausting fluid from said piston chambers including supply and exhaust passages formed on said motor shaft and extending oppositely longitudinally of said shaft from the central transverse planes thereof.

26. In a motor, a stationary cylinder having a central bore, a motor shaft rotatably mounted in said bore and having a peripheral portion fitting said bore, said cylinder having a series of piston chambers arranged about the motor axis with their axes extending parallel with the axis of said shaft, pistons reciprocable oppositely to each other in each piston chamber, wedge-like means arranged at the opposite ends of said motor and connected to said shaft and actuated by different sets of pistons for imparting continuous rotary motion to the motor shaft, and valve means for said piston chambers formed at the portions of said bore and shaft where the peripheral portion of the latter fits the former.

27. In a motor, a cylinder having a central bore, a motor shaft rotatably mounted in said bore, said cylinder having two sets of piston chambers arranged about the motor axis with their axes extending parallel with the axis of said shaft, pistons reciprocable in said piston chambers, wedge-like means arranged at the opposite ends of said motor and actuated by different sets of pistons for imparting continuous rotary motion to the motor shaft, and means for effecting and controlling the supply of pressure fluid to and the exhaust of fluid from said piston chambers including supply and exhaust passages formed on said motor shaft and annular supply and exhaust grooves in said cylinder spaced radially inwardly of said piston chambers.

28. In a motor, a casing having a longitudinal bore, radially offset chambers formed in said casing midway between the ends of said casing, and radial passages connecting said chambers with said longitudinal bore, a series of alined piston chambers formed in said casing offset radially about said longitudinal bore and extending longitudinally of the casing in parallel relation with the motor shaft axis, said piston chambers communicating at their adjacent inner ends with said radially offset chambers, a motor shaft rotatably mounted in said longitudinal bore, pistons in said piston chambers, mechanical connections arranged at the opposite ends of said casing and actuated by said pistons for rotating said motor shaft, and means for effecting and controlling the supply of pressure fluid to said radial passages including supply passages on said motor shaft intermittently communicable with said radial passages and a surrounding annular supply passage with which said supply passages continuously communicate.

29. In a motor, a casing having a longitudinal bore, radially offset chambers formed in said casing midway between the ends of said casing, and radial passages connecting said chambers with said longitudinal bore, a series of alined piston chambers formed in said casing offset radially about said longitudinal bore and extending longitudinally of the casing in parallel relation with the motor shaft axis, said piston chambers communicating at their adjacent inner ends with said radially offset chambers, a motor shaft rotatably mounted in said longitudinal bore, pistons in said piston chambers, mechanical connections arranged at the opposite ends of said casing and actuated by said pistons for rotating said motor shaft, and means for effecting and controlling the supply of pressure fluid to and the exhaust of fluid from said radial passages including supply and exhaust passages formed on said motor shaft and spaced annular supply and exhaust passages in said casing closely adjacent to but at opposite sides of said radial passages.

30. In a motor, a casing having a longitudinal bore, radially offset chambers formed in said casing midway between the ends of said casing, and radial passages connecting said chambers with said longitudinal bore, a series of alined piston chambers formed in said casing offset radially about the longitudinal bore and arranged with their axes parallel with the motor shaft axis, said piston chambers communicating at their inner adjacent ends with said radially offset chambers, a motor shaft rotatably mounted in said longitudinal bore, pistons reciprocable in said piston chambers, plates secured to said shaft at the opposite ends of said casing and each having a cam track with which said pistons cooperate for rotating said motor shaft by the reciprocatory motion of said pistons, and means for effecting and controlling the supply of pressure fluid to said radial passages including an annular supply groove between the ends of one of said series of alined piston chambers.

31. In a motor, a casing having a longitudinal bore, radially offset chambers formed in said casing midway between the ends of said casing, and radial passages connecting said chambers with said longitudinal bore, a series of alined piston chambers formed in said casing offset radially about the bore and arranged with their axes parallel with the motor shaft axis, said piston chambers communicating at their inner adjacent ends with said radially offset chambers, a motor shaft rotatably mounted in said longitudinal bore, pistons reciprocable in said piston chambers, plates secured to said shaft at the opposite ends of said casing and each having a cam track with which said pistons cooperate for rotating said motor shaft by the reciprocatory motion of said pistons, and means for effecting and controlling the supply of pressure fluid to said radial passages including supply passages formed on said motor shaft and an annular supply passage surrounding said supply passages and radially inwards of certain of said piston chambers.

32. In a motor, a casing having a longitudinal bore, radially offset chambers formed in said casing midway between the ends of said casing, radial passages connecting said chambers with said longitudinal bore, a series of alined piston chambers formed in said casing offset radially about said bore and arranged with their axes parallel with the motor shaft axis, said piston chambers communicating at their adjacent inner ends with said radially offset chambers, a motor shaft rotatably mounted in said longitudinal bore, pistons reciprocable in said piston chambers, mechanical connections arranged at the opposite ends of said casing and actuated by said pistons for rotating said motor shaft, and means for effecting and controlling the supply of pressure fluid to and the exhaust of fluid from said radial passages including a series of staggered longitudinal supply and exhaust slots formed on said shaft and spaced annular supply and exhaust grooves constantly communicating with said supply and exhaust slots respectively and surrounded by different series of piston chambers.

33. In a motor, a casing having a longitudinal bore, radially offset chambers formed in said casing midway between the ends of said casing, radial passages connecting said chambers with said longitudinal bore, a series of alined piston chambers formed in said casing offset radially about said bore and arranged with their axes parallel with the motor shaft axis, said piston chambers communicating at their adjacent inner ends with said radially offset chambers, a motor shaft rotatably mounted in said longitudinal bore, pistons reciprocable in said piston chambers, mechanical connections arranged at the opposite ends of said casing and actuated by said pistons for rotating said motor shaft, and means for effecting and controlling the supply of pressure fluid to and the exhaust of fluid from said radial passages including a series of staggered longitudinal supply and exhaust slots formed on said shaft and annular fluid supply and exhaust grooves formed in said casing and disposed closely adjacent but at opposite sides of said radial passages and with which said slots respectively communicate.

34. In a motor, a casing having a bore and a series of longitudinal piston chambers spaced about the bore, a motor shaft rotatably mounted in said bore, pistons reciprocably mounted in said piston chambers, mechanical connections actuated by said pistons for rotating said motor shaft, and means for effecting and controlling the supply of pressure fluid to said piston chambers including longitudinal fluid supply slots formed on said motor shaft and extending therealong beside certain of said piston chambers.

35. In a motor, a casing having a bore and a series of longitudinal piston chambers spaced about the bore, a motor shaft rotatably mounted in said bore, pistons reciprocably mounted in said piston chambers, mechanical connections actuated by said pistons for rotating said motor shaft, and means for effecting and controlling the supply of pressure fluid to said piston chambers including longitudinal fluid supply slots formed on said motor shaft and a fluid supply groove formed in said casing substantially opposite the centers of certain of said piston chambers and with which said longitudinal slots communicate.

36. In a motor, a casing having a bore, a series of longitudinal piston chambers spaced about the bore, and radial passages connecting said piston chambers with said bore, a motor shaft rotatably mounted in said bore, pistons reciprocably mounted in said piston chambers, mechanical connections actuated by said pistons for rotating said motor shaft, and means for supplying pressure fluid to and exhausting fluid from said piston chambers including annular fluid supply and exhaust grooves formed in said casing and series of longitudinal slots formed on said motor shaft, one series of slots communicating with said supply groove and the other series of slots communicating with said exhaust groove and one of said grooves being alongside said piston chambers.

37. In a motor, a casing having a bore, a series of longitudinal piston chambers spaced about the bore, and radial passages connecting said piston chambers with said bore, a motor shaft rotatably mounted in said bore, pistons reciprocably mounted in said piston chambers, mechanical connections actuated by said pistons for rotating said motor shaft, and means for supplying pressure fluid to and exhausting fluid from said piston chambers including annular fluid supply and exhaust grooves formed in said casing and series of longitudinal slots formed on said motor shaft, one series of slots communicating with said supply groove and the other series of slots communicating with said exhaust groove, said series of slots being arranged in staggered relation on said shaft and movable into communication with said radial passages upon shaft rotation and said annular grooves being arranged respectively adjacent the opposite staggered ends of said slots.

MORRIS P. HOLMES.